United States Patent
Hazan

Patent Number: 5,384,887
Date of Patent: Jan. 24, 1995

[54] OPTICAL FIBER CONTROLLED FLYING OBJECT

[75] Inventor: Nisim Hazan, Kiryat Motzkin, Israel

[73] Assignee: State of Israel, Ministry of Defence, Rafael-Amrmaments Development Authority, Haifa, Israel

[21] Appl. No.: 224,826

[22] Filed: Apr. 8, 1994

[30] Foreign Application Priority Data

Apr. 14, 1993 [IL] Israel ............................ 105380

[51] Int. Cl.⁶ .................................................. G02B 6/02
[52] U.S. Cl. .................................. 385/147; 244/3.12; 244/3.16; 385/123
[58] Field of Search ............... 385/100, 101, 115, 123, 385/124, 125, 126, 127, 128, 134, 135, 136, 137, 147; 242/159, 163, 172–174; 244/3.12, 3.16

[56] References Cited

U.S. PATENT DOCUMENTS

| | | | |
|---|---|---|---|
| 4,958,899 | 9/1990 | Rochester | 385/137 |
| 4,995,698 | 2/1991 | Myers | 385/134 X |
| 5,029,959 | 7/1991 | Stubbs | 385/134 |
| 5,056,406 | 10/1991 | Pinson | 244/3.12 X |
| 5,143,319 | 9/1992 | LeCompte | 244/3.12 |
| 5,161,208 | 11/1992 | Christie et al. | 385/128 |

*Primary Examiner*—John D. Lee
*Attorney, Agent, or Firm*—Merchant & Gould Smith, Edell Welter & Schmidt

[57] ABSTRACT

An object suitable for moving through a fluid is provided with a filament canister from which the filament unwinds during movement, one end of the said filament being connected to a launching location, and the said filament has, at each location along its length, a tensile strength determined by combining the maximal value of the sum of the drag tensional load and of the standard tensional load acting on the filament at the said location.

12 Claims, 2 Drawing Sheets

OPTICAL FIBER CONTROLLED FLYING OBJECT

FIELD OF THE INVENTION

The present invention relates to improvements in the construction of flying objects controlled through an optical fiber communication link.

BACKGROUND OF THE INVENTION

Optical fibers are useful as communication links, in order to control flying objects. One example of such a controlled flying object is, e.g., an unmanned aircraft. The flying object normally contains an optical fiber canister, on which several kilometers of optical fiber are wound, which unwind during the flight of the object. The free end of the fiber is connected to the launching position of the object, so that physical connection exists and either mono- or bi-directional communication is possible through the fiber between the flying object and its launching position.

Optical fibers are filaments made of optically pure glass processed so that they are capable of transmitting light therethrough with high efficiency, thus transmitting a large fraction of the light which is directed into the fiber even for long distances, such as many kilometers. Glass fibers are excellent for transmitting communication, and have the considerable advantage of being light in weight and small in diameter. The optical fiber is normally made of silicon dioxide and is coated with a so-called "buffer", which is a polymer layer which is provided to protect the optical fiber from scratches and other surface damages.

While reference is made throughout this specification to "flying objects", its is understood that the same considerations apply also, e.g., to objects moving through water, *mutatis mutandis*, and that the invention is also directed to objects capable of moving through any fluid, such as underwater remotely operated vehicles and the like. Reference to air as the representative fluid is made only for the sake of brevity.

One basic problem which has to be dealt with is to provide a flying object incorporating an optical fiber which is constructed so as to withstand the tensional loads applied to it during flight, and to avoid breakage of the fiber which results in a substantial loss of the object due to loss of communication. It should be noted that the problem of providing a correctly dimensioned fiber is not a minor one. The preferred application is based on winding the bare fiber itself, e.g., a silica core, typically 125 microns in diameter, coated with a thin buffer layer, typically 20–70 microns thick. In this way the fiber core is used as both a lightguide and a strength member, and the tether cable weight, volume and cost are reduced to a minimum. nevertheless, other applications that include an additional strength member (like reinforcement fibers) are also possible.

Because of a statistical distribution of the silica strength, a tensile proof test is used to assure a minimum tensile strength along the whole fiber length, which is supposed to assure that it will withstand the payout loads. Application of high proof test loads to the fiber results in higher failure density during the test (failure density=number of failures per unit length).

At high failure densities the probability of obtaining the desired fiber length in one piece becomes low, which means that either the yield of the process becomes low, or many splices need to be performed to achieve the desired length. In either way, the result is an increase in the fiber cost. Therefore, too weak a fiber will result in rupture, but excessively strong a fiber will be very expensive in the case of a bare fiber, or will add unnecessary weight and volume to the flying object, in the case of a reinforced fiber, thus resulting in shortened flying ranges. As will be appreciated by the skilled person, since the optical fiber employed is several kilometers long, any addition of weight or cost required to improve fiber strength has a substantial influence on the cost and performance of the final object.

THE PRIOR ART

The art has dealt with the problem of dimensioning fibers unwinding from a flying object, by calculating two standard tensional loads which develop on the unwinding filament.

1) The tension in the unwound fiber. This tension can be calculated using the following formula, or other similar relations known in the art:

$$T_P = k \cdot m V_P^2$$

where:
 m=fiber mass per unit length, [Kg/m]
 $V_P$=unwinding velocity, [m/sec] (which is approximately the same as the velocity of the flying object)
 k=a constant depending on the canister geometry and fiber characteristics, typically 1.5–2.5. The value of k can be calculated or can be obtained by empirical testing.

2) The tensile stress due to bending at the peel point (the point on the spool where the fiber begins to unwind) is calculated by:

$$S = (r/R) \times E$$

where:
 S=tensile stress due to bending
 r=the fiber core radius
 R=the radius of curvature at the peel point
 E=modulus of elasticity of the silica core.

Then, according to the known art, the optical fiber is designed to withstand these two loads.

Surprisingly, when optical fibers adapted according to the above or to a similar procedure are used, fiber failure is frequent, with corresponding loss of the flying object. The solution used so far to overcome this problem is to use a fiber which is substantially overqualified, thus obtaining a strength which considerably exceeds that which is calculated according to known methods, and avoiding fiber failures. However, this solution has the considerable drawback of leading to the use of substantially more expensive components than required, which leads to the drawbacks discussed above.

SUMMARY OF THE INVENTION

It has now been surprisingly found that in order to provide sufficiently resistant and economically designed optical links for flying objects it is necessary to provide optical fibers of strength different than was previously thought.

It is an object of the present invention to provide flying objects which utilize correctly designed optical fiber or other filaments, by a simple method.

It is an object of the present invention to provide a method for dimensioning a filament which can withstand tensional load when an object from which it unwinds moves through a fluid.

It is another object of the invention to provide flying objects dimensioned so as to avoid fiber failures.

Other objectives will become apparent as the description proceeds.

Throughout this specification reference is made to optical fibers as the most preferred filament. It should be understood, however, that the same considerations apply to other types of flexible elongated elements as well, and the invention therefore encompasses all suitable types of filaments.

DETAILED DESCRIPTION OF THE INVENTION

The inventors have found that one of the common reasons for fiber failures resides in an additional tensional load imposed on the fiber by the action of drag forces. Thus, in such cases the maximum tensional load acting on the fiber is not that which has heretofore been used to dimension the fiber, as more fully detailed above, but a different, larger tensional load, which is responsible for fiber failure.

The additional tensional load at any point along the fiber, which derives from drag forces is:

$$dT/dl = D_T$$

wherein:

$D_T$ = the component of the drag force in the direction of the fiber axis, for unit length, [N/m]

L = The distance from the flying object along the fiber, [m] and therefore the total tensional load at every point is:

$$T_L = T_P + \int_0^L D_T \cdot dl$$

where $$\int_0^l D_T \cdot dl$$

is the additional tension due to drag.

$D_T$ can be calculated by any suitable known method. One possible empirical relation for such a calculation is as follows:

$$D_T = 1.9 \cdot \rho \cdot U^{3/2} \cdot \cos\alpha \sqrt{\sin\alpha \cdot d \cdot \nu}$$

wherein:

$\rho$ = the density of the fluid [Kg/m$^3$]

U = relative velocity of the fluid with respect to the fiber [m/sec], referred to hereinafter as "wind velocity" for the sake of brevity.

d = diameter of the fiber $\alpha$ = angle between the velocity vector of the fluid relative to the fiber and the fiber axis $\nu$ = viscosity of the fluid [m$^2$/sec]

Figure 1:
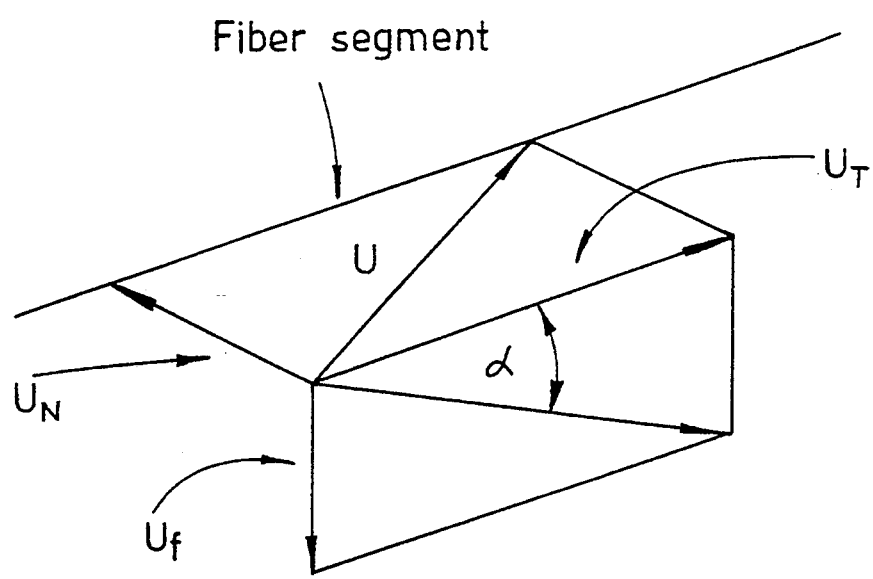
FIG. 1 schematically illustrates the wind speed components near a segment of fiber deployed in the air after being unwound from a flying object.

This empirical formula is applicable in the range $\alpha \approx 4°-90°$. Reference is made to FIG. 1, which illustrates the wind velocity components and angles near a fiber segment, where U is the wind speed vector, $U_N$ is the component of U normal to the fiber axis, and $U_T$ is the component of U parallel to the fiber axis.

Since the fiber tends to drift laterally with speed almost equal to $U_N$ (FIG. 1), the velocity of the fluid relative to the fiber is the vectorial sum of the component which is parallel to the fiber, $U_T$, and of the fiber fall speed, $U_f$, due to the fiber own weight. Thus, the most severe conditions, which should be used to calculate the most extreme load undergone by the fiber, are obtained when the wind is almost parallel to the fiber axis, viz. when $U_T \approx U$.

$U_f$ can be easily calculated by the skilled engineer, on the basis of drag coefficients available in the literature. From the said values it is possible to calculate the value of the angle $\alpha$. $\alpha \approx \tan^{-1}(U_f/U_T)$, and from all the above parameters it is finally possible to calculate the value of $D_T$.

Figure 2:
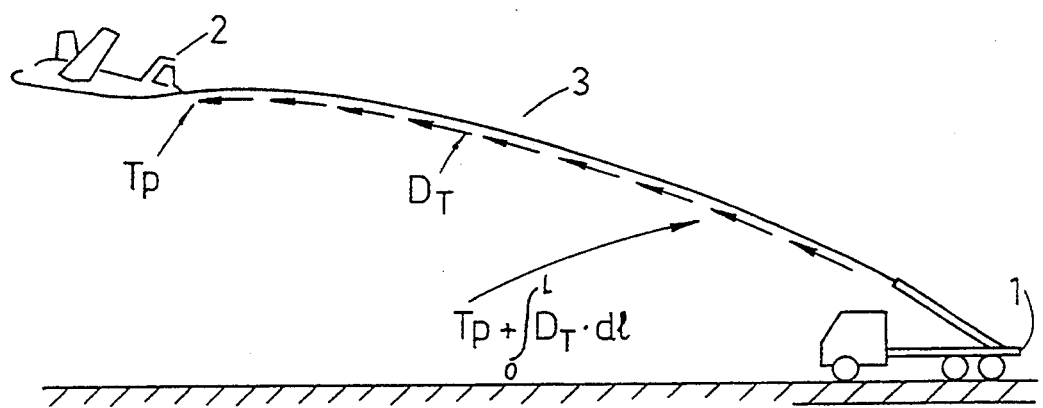
FIG. 2 illustrates a commonly occurring situation in the launching of a flying object, when the wind speed has a considerable component parallel to the flight path (a situation commonly called "tail wind")

One commonly occurring situation is shown in FIG. 2. A launcher, 1, launches a flying object (e.g., an unmanned aircraft), 2, communication with which is effected through an optical fiber, 3, in a "tail wind". The drag tensional loads $D_T$ are also marked on this figure.

Figure 3:
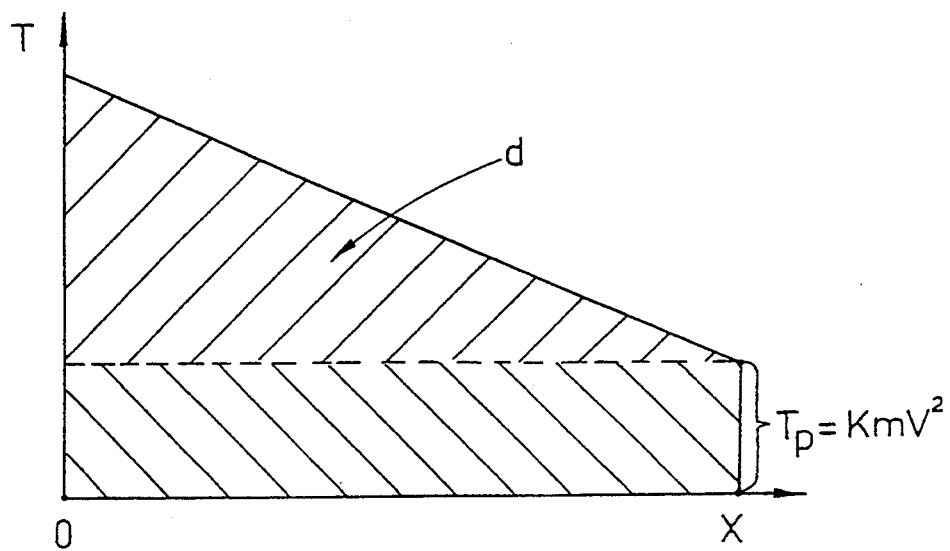
FIG. 3 is a diagram illustrating the tensional load changes with distance along the fiber.

FIG. 3 is a diagram illustrating the tensional load changes with distance. The Y-axis gives the tension T, in the fiber at each point. X is the distance from the launcher, which launcher is positioned at X=0. The payout tensional load $T_P = KmV^2$ is a constant value, and the drag tensional load, indicated by arrow d, is proportional to the distance from the flying object.

Thus, according to the invention, the optical fiber or other filament is chosen so that its minimal strength is grater than the value of T for the maximal flying distance. For the sake of brevity, the term "drag tensional load" will be employed hereinafter to indicate the value of the load per unit length which should be added to the standard prior art values indicated above, in order to determine the true load acting on the fiber and thus the corresponding required strength of the fiber.

One case of practical interest is that of optical fiber for a communication link. Standard optical fibers for this purpose have a silica fiber diameter of about 125 μm and a total diameter (including the polymeric coating of the silica fiber) varying between about 170 μm and 250 μm. For this type of fiber the fall velocity is approximately equal for both diameters, and is about 1.5 m/sec. For such fibers, the following values of drag tensional load apply:

TABLE 1

| External Fiber Diameter (μm) | Wind Velocity (m/sec) | Drag tensional load (Kgf/Km) |
|---|---|---|
| 250 | 10 | 0.17 |
|  | 15 | 0.25 |
|  | 20 | 0.33 |
| 170 | 10 | 0.14 |
|  | 15 | 0.20 |
|  | 20 | 0.27 |

Thus, from the values in Table 1 and the desired flying distance, given the wind speed limit, it is possible to dimension art optical fiber having the required strength, by selecting a fiber which is capable of withstanding a drag tensional load of the appropriate value, multiplied by the number of kilometers which the object is required to fly, plus the standard tensional load. Intermediate values can be obtained with good accuracy from Table 1 by interpolation.

EXAMPLE

A remotely piloted aircraft is controlled via an optical fiber having a 125μ diameter core, 250μ overall diameter and 0.07 gr/m weight. The requirements are:

Maximum range: 12 Km
Cruise speed: 120 m/sec
Wind speed: 15 m/sec.

The K value for the specific fiber is K=2, and the radius of curvature at the peel point is R=6 mm. The tensile stress due to bending at the peel point is relatively small when compared with other stresses and, therefore, is ignored in the example for the sake of brevity.

The tension in the unwound fiber near the aircraft will be:

$$2 \times (0.07/1000) \times 120^2 = 2N \approx 0.2 \text{ Kgf.}$$

The tension increment per unit length for the worst wind conditions will be (from Table 1): 0.25 Kgf/Km.

The maximum tension will be: $0.2 + 0.25 \times 12 = 3.2$ Kg.

Therefore the optical fiber needed for this task should be designed so as to withstand tensile loads of about 3.2 Kg.

The invention is not limited to providing a means to dimension the optical fiber, although, as will be apparent to the skilled person, this is a very important result. It further permits to provide fibers of varying strengths along a communication link for a flying object, and thus to optimize the properties of the fiber at every position from the launching location. As will be apparent to the skilled person, it is possible to connect different optical fibers, e.g., by fusion splicing. Since the drag tensional load in the severe case is the greatest near the launching position, it is possible to determine its actual value and to connect different fiber segments of different strengths, the stronger fiber segments being deployed close to the launching location and the strength of the segments being of descending order towards the flying object. Another possibility is to reduce the proof test level as the fiber is passed through the proof testing machine, so that each point is subjected to a different load, which results in a higher yield. As will be apparent to the skilled person, the invention thus opens the door for a carefully tuned dimensioning of the flying object, so as to obtain the best performance at the lowest price.

All the above description has been provided for the purpose of illustration and is not intended to limit the invention in any way. Many different objects moving through fluids can be constructed according to the invention, and many different filaments and fibers can be employed, all without exceeding the scope of the invention.

I claim:

1. An object suitable for moving through a fluid, the said object being provided with a filament canister from which the filament unwinds during movement, one end of the said filament being connected to a launching location, wherein the said filament has, at each location along its length, a tensile strength determined by combining the maximal value of the sum of the drag tensional load and of the standard tensional load acting on the filament at the said location.

2. An object according to claim 1, wherein the filament is an optical fiber.

3. An object according to claim 2, wherein the optical fiber functions as a communication link.

4. An object according to claim 3, wherein the fluid is air.

5. A method of manufacturing an object moving through a fluid, the said object being provided with a filament canister from which the filament unwinds during movement, one end of the said filament being connected to a launching location, comprising the steps of:
   determining the maximal value of the sum of the drag tensional load and of the standard tensional load acting on the filament at a given location;
   providing on the filament canister a filament having, at each location along the filament, a tensile strength at least equal to the said sum of the standard tensional load and the drag tensional load.

6. A method according to claim 5, wherein the tensile strength of the filament varies along its length.

7. A method according to claim 6, wherein the tensile strength is the greatest at the end of the filament which is deployed near the launching position, and decreases towards the other end.

8. A method according to claim 5, wherein the filament is an optical fiber.

9. A method according to claim 8, wherein the optical fiber functions as a communication link.

10. A method according to claim 9, wherein the fluid is air.

11. A method according to claim 10, comprising selecting a desired flying distance, selecting a required flying speed, selecting the external diameter of the fiber and the expected maximum wind speed limit, determining the drag tensional load from the values given by:

| External Fiber Diameter (μm) | Wind Velocity (m/sec) | Drag tensional load (Kgf/Km) |
|---|---|---|
| 250 | 10 | 0.17 |
|  | 15 | 0.25 |
|  | 20 | 0.33 |
| 170 | 10 | 0.14 |
|  | 15 | 0.20 |
|  | 20 | 0.27 | or by interpolating the said values, and selecting a fiber having a tensile strength at the appropriate location which is at least equal to the sum of the standard tensional load and of the drag tensional load so obtained.

12. An object suitable for moving through a fluid, whenever constructed by the method of claim 5.

* * * * *

UNITED STATES PATENT AND TRADEMARK OFFICE
CERTIFICATE OF CORRECTION

PATENT NO. : 5,384,887
DATED : January 24, 1995
INVENTOR(S) : Nisim Hazan, et. al.

It is certified that error appears in the above-indentified patent and that said Letters Patent is hereby corrected as shown below:

Title page, item [75], inventor: add the following:
Ehud Dekel, Nofit Israel--after "Nisim Hazan, Kiryat, Motzkin, Israel".

Signed and Sealed this

Thirtieth Day of May, 1995

*Attest:*

BRUCE LEHMAN

*Attesting Officer*     *Commissioner of Patents and Trademarks*